United States Patent [19]
Tada et al.

[11] Patent Number: 5,986,840
[45] Date of Patent: Nov. 16, 1999

[54] AMPLIFIER WITH CAPACITIVE FEEDBACK FOR DRIVING A MAGNETO-RESISTIVE HEAD

[75] Inventors: Masashige Tada; Takehiko Umeyama, both of Tokyo, Japan

[73] Assignee: Mitsubishi Denki Kabushiki Kaisha, Tokyo, Japan

[21] Appl. No.: 08/733,325

[22] Filed: Oct. 17, 1996

[30] Foreign Application Priority Data

Apr. 19, 1996 [JP] Japan ................................. 8-098541

[51] Int. Cl.⁶ ............................. G11B 5/02; G11B 15/12; H03F 1/30
[52] U.S. Cl. ............................. 360/67; 360/62; 330/290
[58] Field of Search .................... 330/290, 294, 330/107, 259; 327/110, 362, 545; 360/77.05, 77.08, 77.17, 46, 62, 67

[56] References Cited

U.S. PATENT DOCUMENTS

| | | | |
|---|---|---|---|
| 4,550,351 | 10/1985 | Hamalainen | 360/77.17 |
| 5,426,542 | 6/1995 | Smith | 360/67 |
| 5,534,818 | 7/1996 | Peterson | 360/46 X |
| 5,694,083 | 12/1997 | Umeyama et al. | 330/259 |

FOREIGN PATENT DOCUMENTS 6150208  5/1994  Japan .

*Primary Examiner*—W. Chris Kim
*Attorney, Agent, or Firm*—Leydig, Voit & Mayer, Ltd.

[57] ABSTRACT

A MR head amplifier of the present invention prevents a base potential of a transistor which supplies a current to a MR element from changing in a moment when the MR element changes from a write-state to a read-state. The MR head amplifier includes a loop amplifier that has a non-inverted input terminal connected to one end of a first transistor which supplies a current to a MR element and an inverted input terminal connected to one end of a second transistor which is supplied with a constant current through a constant current source. An output terminal of the loop amplifier is feedback to a base terminal of the first transistor via a first switch and one end of a capacitor whose other end is connected to a ground is connected to an output terminal of the first switch. The loop amplifier includes a second switch connected between the output terminal of the first switch and the base terminal of the first transistor, the second switch being closed during read-state and opened during write-state.

7 Claims, 12 Drawing Sheets

FIG. 2A  READ/WRITE  |←READ→|←WRITE→|←READ
FIG. 2B  SW1  ON/OFF 
FIG. 2C  SW2  ON/OFF 
FIG. 2D  POTENTIAL AT POINT A 
FIG. 2E  OUT A − OUT B 

FIG. 6A  READ/WRITE
FIG. 6B  SW1
FIG. 6C  SW3

AMPLIFIER WITH CAPACITIVE FEEDBACK FOR DRIVING A MAGNETO-RESISTIVE HEAD

BACKGROUND OF THE INVENTION

1. Field of the Invention

The invention relates to a hard disc drive, more specifically, it relates to a magneto-resistance head amplifier which is used mainly as a read amplifier for driving a head(hereafter, an MR head) comprising a magneto-resistance (MR) effect element. The MR head amplifier of the present invention has a simple construction to switch from a writing mode to a reading mode in a short time, where a bias point of a loop amplifier used for the MR head amplifier can be prevented from moving.

2. Description of the Prior Art

FIG. 10 shows a conventional MR head amplifier. The MR head amplifier is usually used for reading signals out of a disc and another circuit is used for writing signals. The above reading circuit and writing circuit are used alternately. The writing circuit writes data in the disc by flowing a current through an inductor such as a thin film head. Since the writing circuit is adjacent to the MR head, a writing current generated by the write-head during writing data flows into the MR element constituting MR head as noise.

As a result, the noise induced to the MR element flows into a transistor of the MR head amplifier. The current further flows through a load resistor of the transistor and it moves the bias point of an input point of the loop amplifier constituting a closed feedback loop. When the bias point is moved, the closed loop tries to return the bias point to the original level at a moment when the MR head amplifier switches from a write-state to a read-state, then, a sag is generated in an output of the amplifier. As a result, it is not possible to read the data signal until after a certain time when sag decreases if the MR head amplifier switches from the write-state to the read-state. In order to solve this problem, changing of a bias potential is compensated for by using a loop amplifier and a switch as shown in FIG. 10.

In FIG. 10, the MR head amplifier comprises an MR element 1, a transistor 2, resistors 3, 4, a constant current source 5, a loop amplifier 6, a capacitor 9, a switch 10, and a signal amplifier 12. While reading (READ) the data signal, a closed loop for supplying the bias current through the MR element is provided. This feedback circuit feeds back to adjust an output current $I_0$ of the loop amplifier 6 so that a voltage drop by a current Ir flowing through the resistor 4 is equal to a voltage drop by a current I flowing through the MR element and the resistor 3. In other words, the loop amplifier 6 operates by a differential voltage between the voltage drop of the resistor 3 and the voltage drop of the resistor 4.

On the assumption that a resistance of the resistor 3 is R1, a resistance of the resistor 4 is R2, and the current flowing through the MR element 1 is I, then $V_B=Vcc-Ir \times R2$, $V_A=Vcc-I \times R1$. As a result, $I \times R1 = Ir \times R2$ is obtained if $V_A=V_B$. Therefore, the current I flowing through the MR element 1 is $I=Ir \times (R2/R1)$. If R2=R1, the current I is constantly equal to Ir. In other words, in the case where resistance of the resistor 3 is equal to the resistance of the resistor 4, the loop amplifier 6 gives a feedback current to the transistor 2 so that the current Ir is equal to the current I flowing through the MR element. In the case the where the potential $V_A$ at a node n1 (+terminal) is equal to or smaller than the potential $V_B$ at a node n2 (−terminal) of the loop amplifier 6, the loop amplifier 6 does not supply a base current to the transistor 2.

When the state of the loop amplifier changes from the stable state to a state in which the potential $V_A$ at the node n1 (+terminal) is larger than the potential $V_B$ at the node n2 (−terminal) of the loop amplifier 6, the loop amplifier 6 supplies the current to the transistor 2, which charges the capacitor 9 to decrease the potential $V_A$. In this way, the potential $V_A$ is kept at a constant value, therefore, the current flowing through the MR element 1 is constant. Alternatively, a capacitance $C_0$ of the capacitor 9 used for setting a time constant of the loop has a large capacitance value such that the loop current can not respond to the frequency of the data signal.

FIGS. 11A–11D show timing charts of the conventional MR head amplifier. The first switch 10 is controlled to be ON during the read-state of reading the data, while controlled to be OFF during the write-state of writing the data as shown in FIG. 11B. In the conventional MR head amplifier, since a large current flows through the MR head during writing the data, the writing signal affects the current flowing through the MR element 1. As a result, since a writing current ΔI is superposed on the current I flowing through the MR element 1, the current flowing through the resistor 3 changes which changes the voltage drop of the resistor 3. The potential $V_A$ of the node n1 decreases if the writing current ΔI has a positive value, while it increases if the writing current ΔI has a negative value. Therefore, the potential at the bias point (node n1) of the read amplifier 6 drifts according to the current I influenced by the writing current ΔI. In order to solve this problem, the switch 10 is turned OFF during writing in order to prevent the loop amplifier 6 from holding the potential of the capacitor 9 constant.

FIG. 12 shows a loop amplifier 6 shown in FIG. 10. In FIG. 12, the loop amplifier 6 comprises transistors 21, 22, transistors 23, 24, and transistors 28, 29 which, respectively, constitute current mirror circuits, transistors 25, 26 constituting a differential amplifier, a constant current source 27, an inverted input terminal IN⁻, a non-inverted input terminal IN⁺, and an output terminal OUT. As shown in FIG. 10, the non-inverted input terminal IN⁺ is connected to the node n1, and the inverted input terminal IN⁻ is connected to the node n2. In the case where a current I of the transistor 2 in FIG. 10 decreases by a noise inputted into the MR element 1, the potential $V_A$ at the node n1 increases. This potential increase at the node n1 causes a base potential of the transistor 26 in FIG. 12 to increase. As a result, a current of the transistor 26 increases by ΔI which also increases a current of the transistor 23 by ΔI. Since the transistor 2 and the transistor 24 are coupled by a current mirror connection, the current in the transistor 24 also increases by ΔI. The current increase of ΔI is outputted from the output terminal OUT of the loop amplifier 6 and supplied to a base of the transistor 2. Therefore, the current of the transistor 2 in FIG. 10 increases, which also causes the current through the resistor 3 to increase, and therefore the potential of the node n1 decreases. In this way, the potential $V_A$ at the node n1 returns to the earlier potential value.

As described above, the potential at the bias point of the read amplifier does not change if the noise signal from the write-head enters into the MR head during writing. However, since the capacitor 9 is directly connected to the base of the transistor 2, the capacitor 9 discharges its potential under the influence of the base current of the transistor 2 when the MR head amplifier is writing the data as shown in FIG. 11C. As a result, the potential at the node n1 decreases. When MR head amplifier changes to the read-state and the switch 10 is turned ON, the current of the transistor 2 suddenly decreases since the low potential is supplied to the base of the transistor 2. As a result, there is a problem that the potential $V_A$ at the node n1 increases suddenly and the sag is generated between the signal outputs OUT A and OUT B as shown in FIG. 11D.

SUMMARY OF THE INVENTION

It is an object of the present invention to solve the above problem. In the present invention, the potential of the capacitor at the node n1 is prevented from changing when the first switch turns OFF, by which the potential at the node n1 can be avoided from changing when the MR head amplifier changes from the write-state to the read-state.

According to one aspect of the invention, an MR head amplifier comprising a loop amplifier including a non-inverted input terminal connected to one end of a first transistor which supplies a current to an MR element and an inverted input terminal connected to one end of a second transistor which is supplied with a constant current through a constant current source, wherein an output terminal of the loop amplifier is feedbacked to a base terminal of the first transistor via a first switch and one end of capacitor whose other end is connected to a ground is connected to an output terminal of the first switch, comprises a second switch connected between the output terminal of the first switch and the base terminal of the first transistor, the second switch is closed during read-state and opened during write-state.

According to another aspect of the invention, the MR head amplifier further comprises a current supply circuit connected to an output terminal of the second switch for supplying a current to the base of the first transistor when the MR element is in write-state.

According to further aspect of the invention, the MR head amplifier further comprises a hold amplifier, whose non-inverted terminal is connected to an input terminal of the second switch and whose inverted terminal and whose output terminal are connected to an output terminal of the second switch.

Preferably, the hold amplifier in the MR head amplifier is a current output type operational amplifier.

According to still further aspect of the invention, the MR head amplifier comprises a third switch comprising first and second input terminals and an output terminal; and a hold amplifier including a non-inverted input terminal, an inverted input terminal and an output terminal; wherein the first terminal of the third switch is connected to a non-inverted input terminal and the output terminal of the first switch and the second input terminal of the third switch is connected to the output terminal of the hold amplifier and the inverted-input terminal thereof, and the output terminal of the third switch is connected to the base terminal of the first transistor, the first terminal of the third switch is selected during read-state and the second terminal of the third switch is selected during write-state.

Preferably, the hold amplifier in the MR head amplifier is a voltage output type operational amplifier.

BRIEF DESCRIPTION OF THE DRAWINGS

FIGS. 2A–2E show timing diagrams of the MR head amplifier using the current output type amplifier of the first embodiment of the present invention.

FIGS. 6A–6C show timing diagrams of the MR head amplifier using the voltage output type amplifier of the fourth embodiment of the present invention.

DETAILED DESCRIPTION OF THE PREFERRED EMBODIMENTS

Embodiment 1

Figure 1:
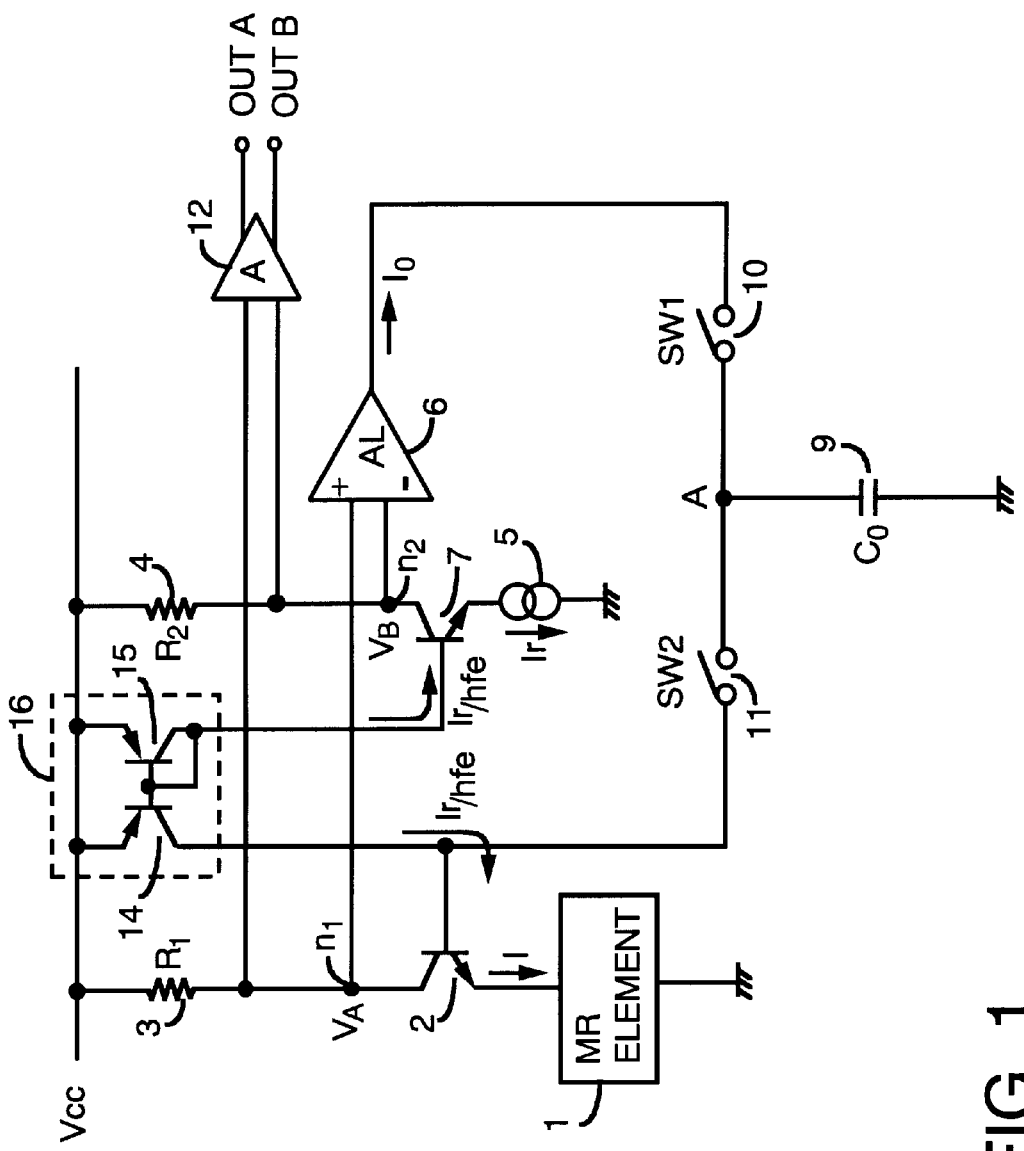
FIG. 1 shows an MR head amplifier using a current output type amplifier of a first embodiment of the present invention.

FIG. 1 shows an MR head amplifier of a first embodiment of the present invention. FIGS. 2A–2E show timing charts of the MR head amplifier shown in FIG. 1.

Figure 10:
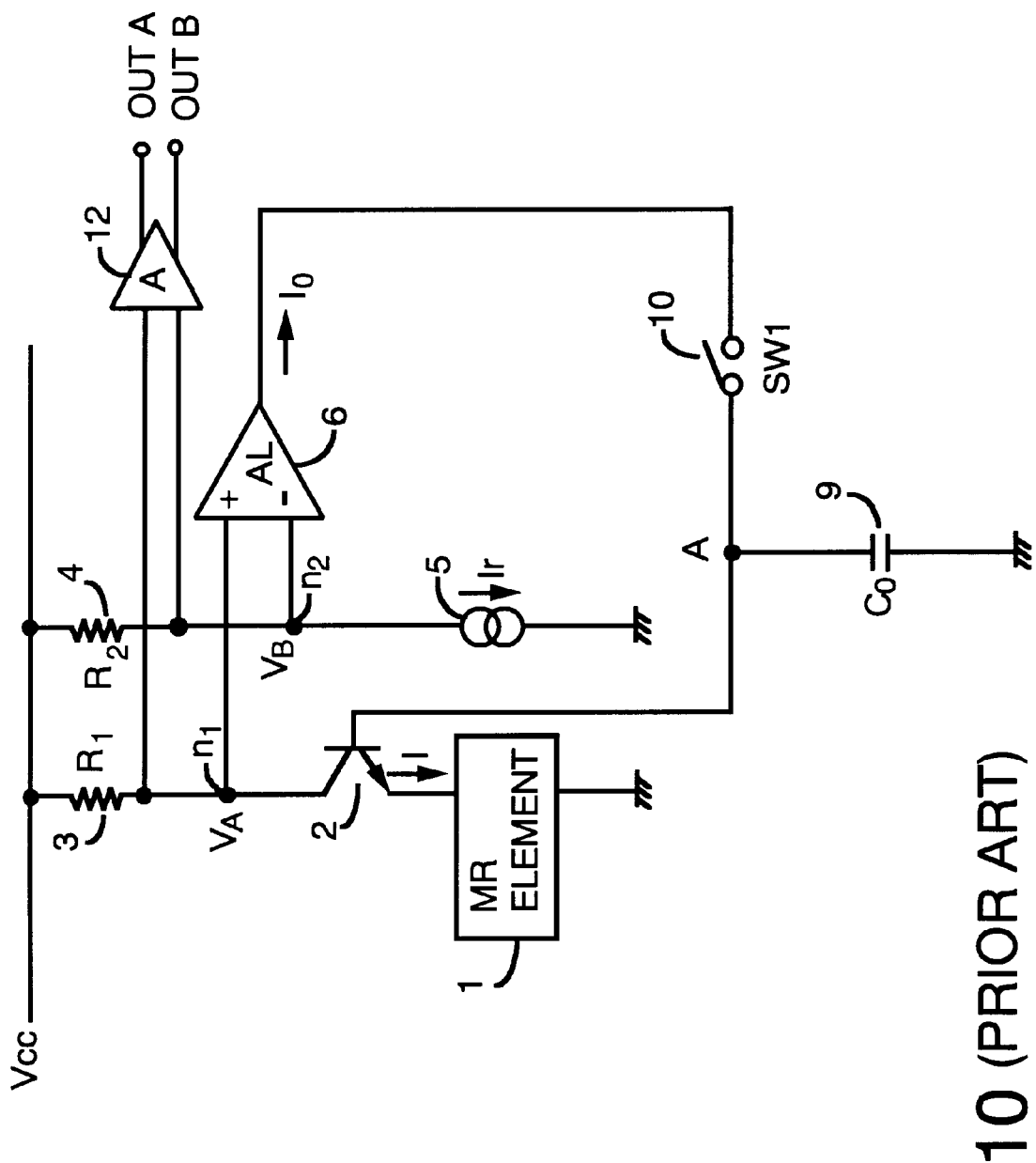
FIG. 10 shows a conventional MR head amplifier.

In FIG. 1, the MR amplifier comprises a first switch 10, a second switch 11, and transistors 14, 15 which constitute a current mirror circuit. The current mirror circuit operates as a bias current compensation circuit 16 for supplying a bias current I to an MR element 1. Elements commonly numbered in FIG. 1 and FIG. 10 are not provided with a detailed explanation here. Those elements are described above in connection with FIG. 10.

As shown in FIG. 2A, both the first switch 10 and the second switch 11 are in the ON state during the reading (READ) of a data signal and a feedback circuit including a loop amplifier 6 forms a closed loop for supplying the bias current through the MR element. This feedback circuit operates to give feedback to a transistor 2 to adjust an output current lo of the loop amplifier 6 so that a voltage drop of a resistor 4 by a current Ir is equal to a voltage drop of a resistor 3 by an MR element current I. In other words, the loop amplifier 6 operates by a differential voltage between the voltage drop of the resistor 3 and the voltage drop of the resistor 4.

In FIG. 1, since a reference current Ir is supplied by a constant current source 5, a potential a resistor $V_B$ at a node n2 is given such as $V_B=Vcc-Ir \times R2$. At this time, a base current of a transistor 7 is Ir/hfe. Where, hfe is a small signal current amplification factor of the transistor 7. The same base current Ir/hfe is supplied to the transistor 2 by the current mirror circuit comprising the transistors 14, 15, namely, to the MR element 1. Since, the base current Ir/hfe is constantly supplied to the base of the transistor 2, a current I is supplied to the emitter of the transistor 2.

Therefore, a potential $V_A$ at a node n1 is given as $V_A=Vcc-I \times R1$. On the other hand, the potential $V_B$ at the node n2 is given such as $V_B=Vcc-Ir \times R2$. If $V_A=V_B$, a relationship of $I \times R1=Ir \times R2$ is obtained. Therefore, the current I flowing through the MR element 1 is given such as $I=Ir \times (R2/R1)$. On the assumption that R2=R1, the current I is constantly equal to Ir. In other words, in the case where the resistance of the resistor 3 is equal to the resistance of the resistor 4, the loop amplifier 6 gives feedback to the transistor 2 so that the current Ir flowing through the resistance R2 equals the current I flowing through the MR element. In the case where the potential $V_A$ at the node n1 (+terminal) is equal to or less than the potential $V_B$ at the node n2 (−terminal) of the loop amplifier 6, the loop amplifier 6 does not supply the base current to the transistor 2.

When the loop amplifier changes from the stable state to a state in which the current I decreases for some reasons, the potential $V_A$ at the node n1 (+terminal) becomes larger than the potential $V_B$ at the node n2 (−terminal) of the loop amplifier 6. At this time, the loop amplifier 6 supplies the current $I_0$ to the transistor 2, which charges the capacitor 9 to decrease the potential $V_A$. In this way, the potential $V_A$ is kept at a constant value, therefore, the current flowing through the MR element 1 is constant. Alternatively, a capacitance $C_0$ of the capacitor 9 for setting a time constant of the loop has a large capacitance value such that the loop current can not respond to the frequency of the data signal.

As shown in FIGS. 2B, 2C, the first switch 10 and the second switch 11 are OFF during writing the data. Since a large current flows through the head when writing the data into the hard disc, the writing signal is induced into the MR element 1 which is adjacent to the write-head. As a result, an infinitesimal writing current ΔI is superposed on a current I flowing through the MR element 1 and then the superposed current flows through the resistor 3 which changes the voltage drop of the resistor 3. In the case where the infinitesimal writing current ΔI has a positive value, the potential $V_A$ at the node n1 decreases, while in the case where the current ΔI has a negative value, the potential $V_A$ at the node n1 increases. However, since both the first switch 10 and the second switch 11 are in OFF state during write-state (FIGS. 2B, 2C), the change of a base potential of the transistor 2 due to the current ΔI does not influence the potential of the capacitor 9. In other words, the potential of the capacitor 9 is kept constant (FIG. 2D).

When the state of the MR head amplifier changes from the write-state to the read-state, both the first switch 10 and the second switch 11 turn ON. Since the capacitor 9 has been separated from the feedback circuit during the write-state, the potential is not changed until the read-state starts. Therefore, when the potential of the capacitor 9 is applied to the base of the transistor 2 when the write-state changes to the read-state, the current of the transistor 2 returns to the value I which is the same value as the original current value at the preceding read-state. Therefore, the read-state in which the MR element 1 operates normally is provided quickly. As a result, the signal output in reading does not include any sag between the signal outputs OUT A and OUT B in FIG. 1

Embodiment 2

Figure 3:
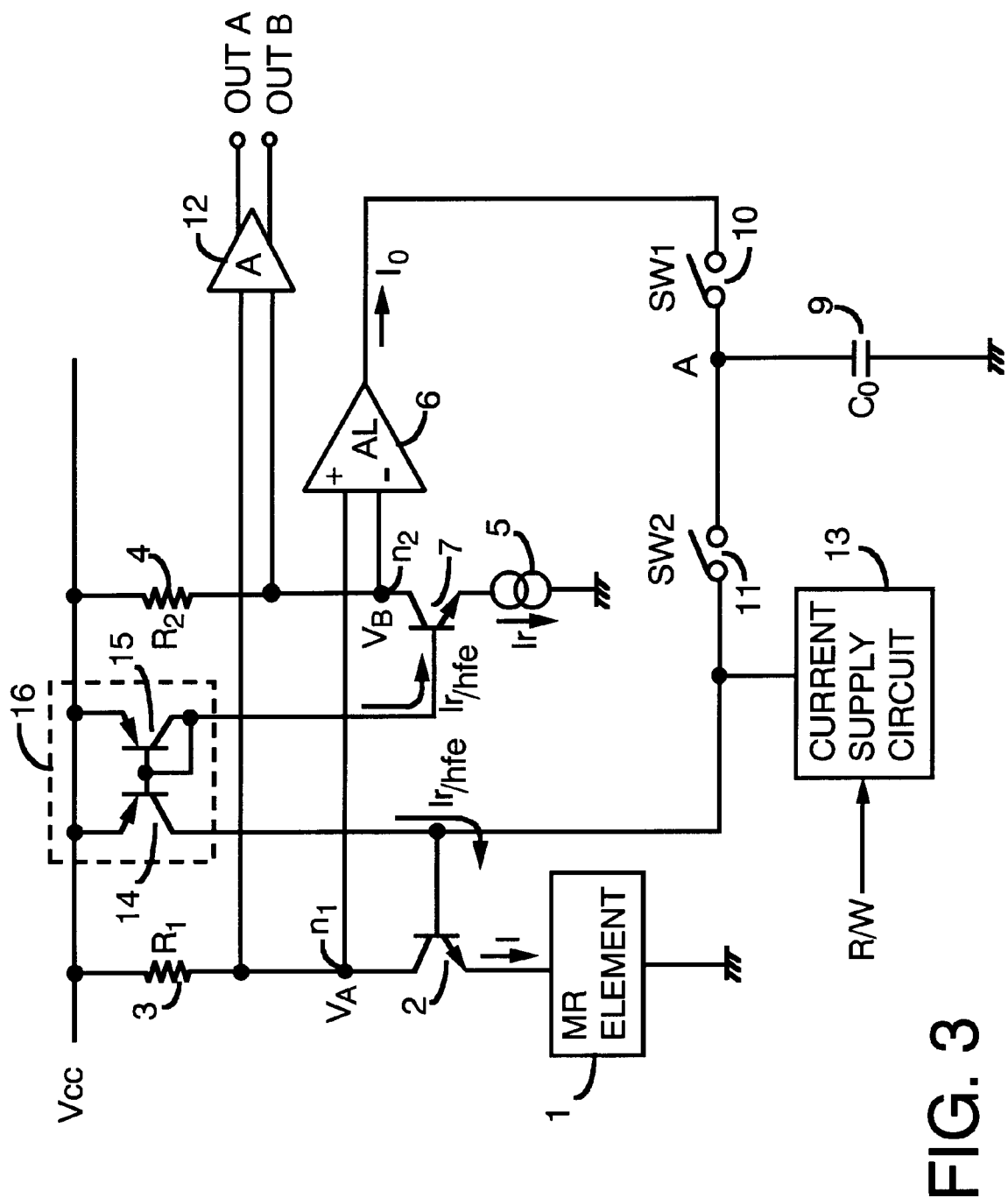
FIG. 3 shows an MR head amplifier using a current output type amplifier of a second embodiment of the present invention.

FIG. 3 shows an MR head amplifier of a second embodiment of the present invention. In FIG. 3, a bias current compensation circuit 16 comprises a current mirror circuit and supplies a bias current I to an MR element 1. A current supply circuit 13 is a current amplifier for supplying a current to a transistor 2. The current supply circuit 13 is controlled by a read/write switching signal R/W to supply the current to a base of the transistor 2 when the read/write switching signal R/W is high and is controlled not to operate when the read/write switching signal R/W is low. Elements commonly numbered in FIG. 3 and FIG. 10 are not provided with a detailed explanation here. Those elements are described above in connection with FIG. 10.

When reading (READ) the data signal, both the first switch 10 and the second switch 11 are in the ON state and a feedback circuit including a loop amplifier 6 forms a closed loop for supplying the bias current through the MR element. This feedback circuit operate to give feedback to a transistor 2 to adjust an output current $I_0$ of the loop amplifier 6 so that a voltage drop of a resistor 4 by a current Ir is equal to a voltage drop of a resistor 3 by an MR element current I. Since the current supply circuit 13 does not operate in this state, the base current of the transistor 2 is supplied by the bias current compensation circuit 16.

An operation of the bias current compensation circuit 16 is explained below. Since the current Ir flows through a collector of a transistor 7, a current Ir/hfe is supplied to a base of the transistor 7 by a transistor 15. This current Ir/hfe is supplied to the base of the transistor 2 by the bias current compensation circuit 16 comprising the current mirror circuit including a transistor 14 and the transistor 15. According to the base current Ir/hfe of the transistor 2, a collector current Ir which is the same as the current I flows through a collector of the transistor 2. In this way, the base current of the transistor 2 is supplied by the bias current compensation circuit 16.

When the state of the MR amplifier changes from a read-state to a write-state as shown in FIG. 2A, both the first switch 10 and the second switch 11 turn OFF as shown in FIGS. 2B and 2C, and, consequently, a capacitor 9 is separated from the feedback circuit which is referred to as a floating state. In this floating state, the potential of the capacitor 9 at point A is kept to a constant value without discharging. As mentioned above, since a large current flows through the MR head of a hard disc during the write-state, the writing signal is induced into the MR element 1 which is adjacent to the write-head. As a result, a writing current ΔI is superposed on the current I flowing through the MR element 1, and, consequently, the current flows the resistor 3 and the voltage drop of the resistor 3 changes. The potential $V_A$ at a node n1 decreases when the current ΔI has a plus value. The current Ir/hfe is supplied to the base of the transistor 2 as mentioned above. Since the current Ir/hfe depends on a constant current source 5, if the current I of the transistor 2 increases more than the current corresponding to the current Ir/hfe, the increased base current is supplied by the current supply circuit 13.

In this case, although the potential $V_A$ at the node n1 changes since the feedback loop circuit including the loop amplifier 6 is open, the potential $V_A$ at the node n1 is not compensated at all. Furthermore, although a signal including noise is also inputted into a signal amplifier 12, the noise signal induced at the MR element 1 has no effect on the MR head amplifier because no signal processing is conducted in the signal amplifier 12 during the write-state.

When the MR head amplifier changes to the read-state, both the first switch 10 and the second switch 11 turn ON, and the potential of the capacitor 9 at point A is applied to the base of the transistor 2. Since the capacitor 9 is separated from the feedback loop during the write-state, a potential at a point A is kept to the potential of the preceding read-sate. When both the first switch 10 and the second switch 11 turn ON, the potential at the point A is applied to the base of the transistor 2, and, consequently, the current of the transistor 2 returns to the preceding current value I. In this way, the state for a normal reading operation by the MR element 1 is prepared and no sag is generated between signal output terminals (OUT A–OUT B) during the read-state as shown in FIG. 2E.

Embodiment 3

Figure 4:
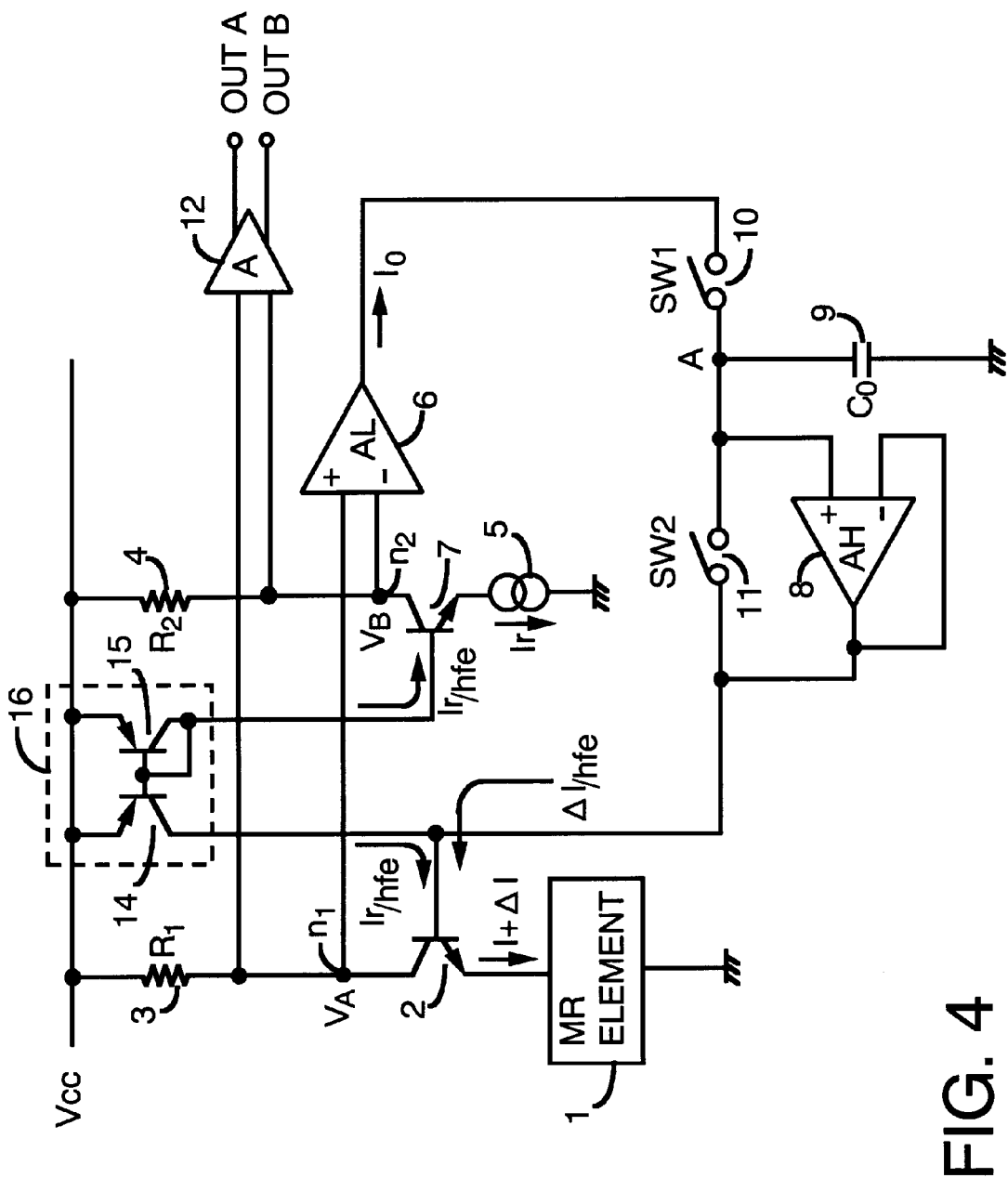
FIG. 4 shows an MR head amplifier using a current output type amplifier of a third embodiment of the present invention.
Figure 8:
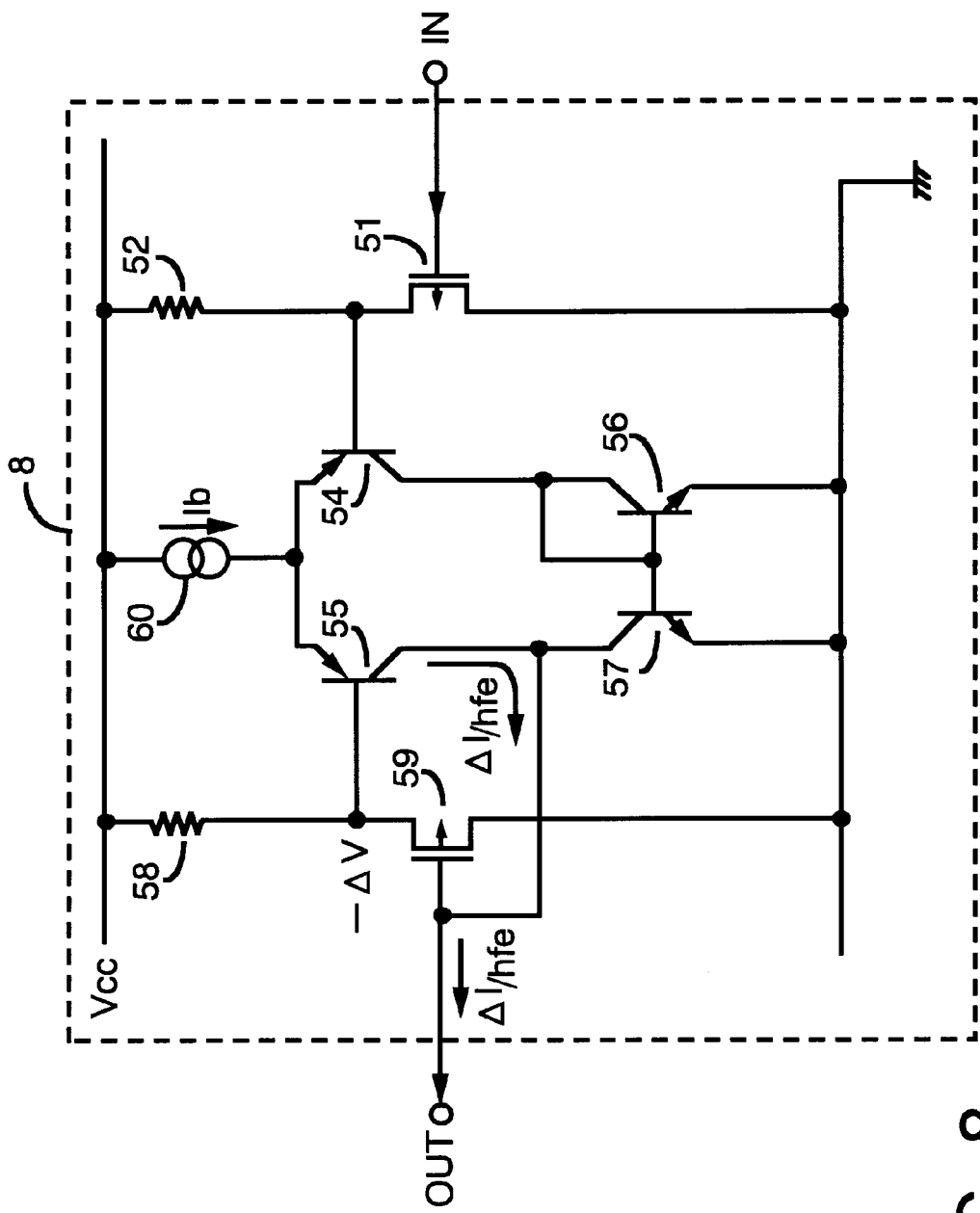
FIG. 8 shows an example of a hold amplifier using a current output type amplifier.

FIG. 4 shows an MR head amplifier of a third embodiment of the present invention. In FIG. 4, a hold amplifier 8 uses a constant current output type amplifier having a high input impedance for example as shown in FIG. 8. Elements commonly numbered in FIG. 4 and FIG. 1 are not provided with a detailed explanation here. Those elements are described above in connection with FIG. 1. The operation during a read state is the same as that shown in FIGS. 1 and 2, and further explanation is not provided. When the state of the MR head amplifier changes from the read-state to a write-state as shown in FIG. 2A, both a first switch 10 and a second switch 11 are in the OFF state as shown in FIGS. 2B, 2C.

In FIG. 4, a plus terminal of the hold amplifier 8 is connected to a point A which is a junction of the first switch 10, the second switch 11, and a capacitor 9. A minus terminal of the hold amplifier 8 is connected to an output terminal of the hold amplifier 8 and an output terminal of the second switch. This hold amplifier 8 operates for supplying a current to a base of a transistor 2 during the write-state. Since the input impedance at the plus terminal of the hold amplifier 8 is remarkably large, the capacitor 9 is separated from a feedback circuit. As a result, the capacitor 9 does not discharge its potential and the potential at the point A is kept to a constant value. An operation of the hold amplifier 8 is explained below using FIG. 8.

FIG. 8 shows an example of the hold amplifier using the current output type amplifier. In FIG. 8, transistors 54, 55 constitute a differential amplifier, transistors 56, 57 constitute a current mirror circuit, a serial circuit comprising a resistor 52 and a transistor 51 and a serial circuit comprising a resistor 58 and a transistor 59 are, respectively, bias supply circuits. The potential at the point A is applied to a base of the transistor 51 and the base electrode of the transistor 2 is connected to a gate of the transistor 59 and a collector of the transistor 57.

Since a large current flows through the head when writing data into the hard disc, the writing signal is induced into the MR element 1 which is adjacent to the write-head. As a result, an infinitesimal writing current $\Delta I$ is superposed on a current I flowing through the MR element 1 and then the superposed current flows through the resistor 3 which changes the voltage drop of the resistor 3. In case the writing current $\Delta I$ has a plus value, a potential $V_A$ at a node n1 decreases. A base current supplied to the base of the transistor 2 is Ir/hfe as mentioned above. Since this value is dependent on a constant current source 5, in case a current I of the transistor 2 increases, the increased base current is supplied by the hold amplifier 8. In case the current of the MR element 1 increases by $\Delta I$, for example, the base potential of the transistor 2 decreases by $\Delta V = \Delta I \times R1$. As a result, a source potential of the transistor 59 in the hold amplifier 8 decreases by $\Delta V$ and a current flowing through the transistor 55 increases by $\Delta I/\text{hfe}$. This current $\Delta I/\text{hfe}$ is supplied to the base of the transistor 2 via the OUT terminal of the hold amplifier 8 to supply a current $\Delta I$ which is necessary for the MR element 1.

Although the potential $V_A$ at the node n1 varies, since a feedback loop circuit including a loop amplifier 6 is open, the potential $V_A$ at the node n1 is not compensated at all. Furthermore, although a signal including a noise is also inputted into a signal amplifier 12, the signal superposed on the MR element 1 has no effect on the MR head amplifier because no signal processing is conducted during the write-state.

When the MR head amplifier changes to the read-state, both the first switch 10 and the second switch 11 turn ON and the potential of the capacitor 9 at point A is applied to the base of the transistor 2. Although the capacitor 9 is connected to the plus input terminal of the hold amplifier 8 during the write-state, an impedance of the plus input terminal is high and the capacitor 9 is in the state equivalent to being separated from the feedback loop so the potential at the point A is kept to a constant value since the preceding write-state. When both the first switch 10 and the second switch 11 turn ON, the held potential at the point A is applied to the base of the transistor 2, and, consequently, the current of the transistor 2 returns to the preceding current value I in a moment. In this way, the state for a normal reading operation by the MR element 1 is prepared in a moment. Therefore, no sag is generated between signal output terminals (OUT A–OUT B) in the read-state as shown in FIG. 2E.

Embodiment 4

Figure 5:
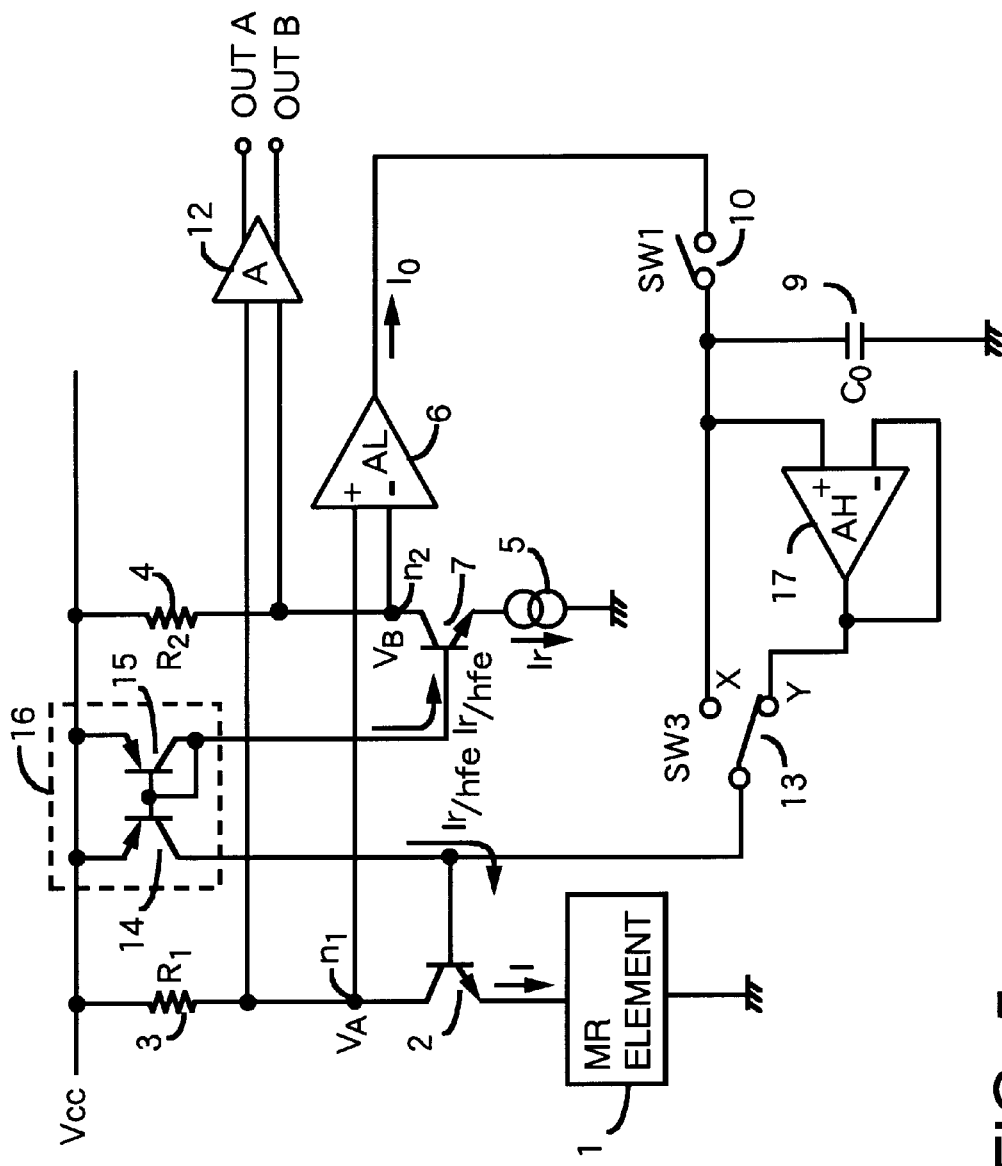
FIG. 5 shows an MR head amplifier using a voltage output type amplifier of a fourth embodiment of the present invention.

FIG. 5 shows an MR head amplifier using a voltage output type amplifier of a fourth embodiment of the present invention. FIGS. 6A–6C show the timing diagrams of the MR head amplifier of the fourth embodiment of the present invention. A third switch 13 used in FIG. 5 is explained below using FIGS. 7A, 7B.

Figure 7A:
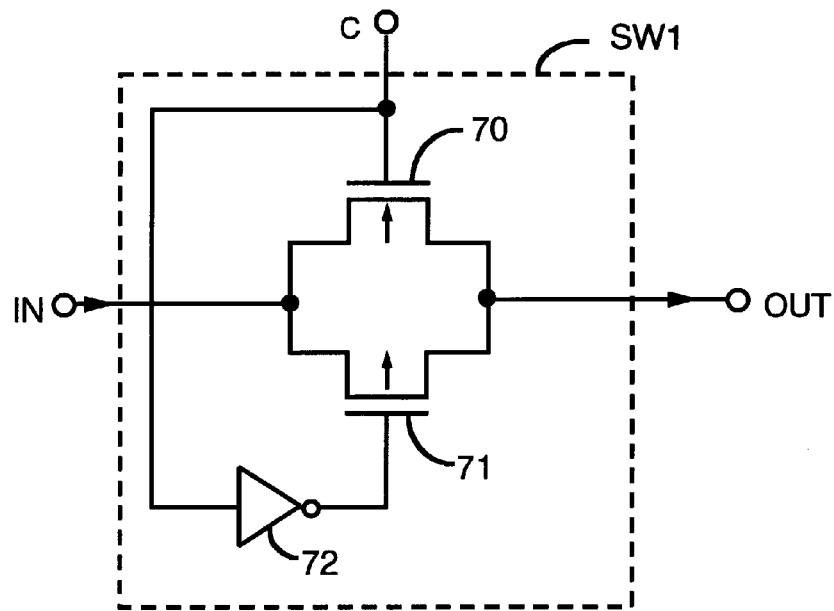
FIGS. 7A, 7B show analog switches of the fourth embodiment of the present invention.
Figure 7B:
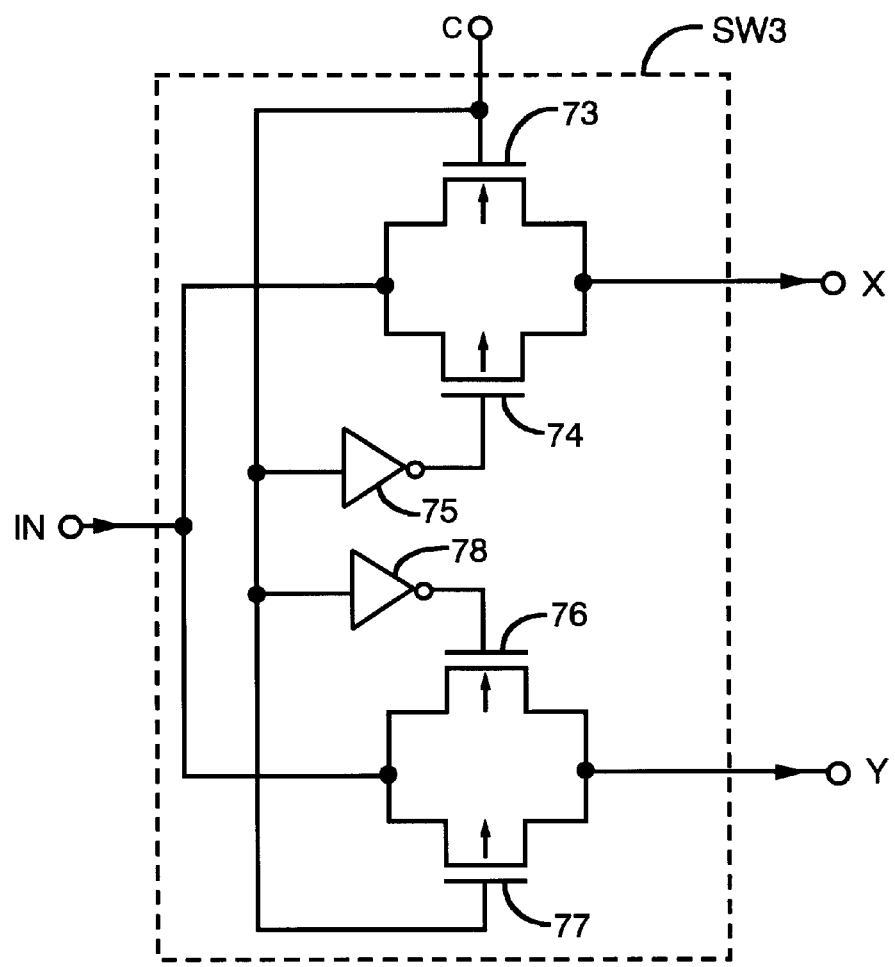

FIGS. 7A, 7B show analog switches constituting a first switch 10 and the third switch 13 of the fourth embodiment of the present invention. In FIG. 7A, the first switch 10 comprises transistors 70, 71 and an invertor 72. When a control terminal C is logical high, an input terminal IN is connected to an output terminal OUT. When the control terminal C is logical low, the input terminal IN is separated from the output terminal OUT. A third switch 13 comprises transistors 73, 74, an invertor 75, transistors 76, 77, and an invertor 78. When a control terminal C is logical high, an input terminal IN is connected to an output terminal X. When the control terminal C is logical low, the input terminal IN is connected to an output terminal Y.

An operation of the MR head amplifier of the fourth embodiment is explained below using FIG. 5. The operation during the read-state is not provided with an explanation in FIG. 5, since this operation is explained above in connection with FIGS. 1, 2, and 4.

When the amplifier changes from the read-state to the write-state as shown in FIG. 6A, the first switch 10 turns OFF, and the third switch 13 is connected to the output terminal Y as shown in FIGS. 6B, 6C. In FIG. 5, a plus terminal of a hold amplifier 17 is connected to a point A which is a junction of an X terminal of the third switch 13 and a capacitor 9 while a minus terminal of the hold amplifier 17 is connected to an output terminal of the hold amplifier 17. This hold amplifier 17 operates for supplying a current to a base of a transistor 2 during the write-state. Since an input impedance at the plus terminal of the hold amplifier 17 is extremely large, the capacitor 9 is separated from a feedback circuit and a potential of the capacitor 9 at point A is kept to a constant value without discharging. The hold amplifier 17 of the fourth embodiment is different from the hold amplifier 8 of the third embodiment in that the hold amplifier 17 is a buffer amplifier for outputting voltage while the hold amplifier 8 is a buffer amplifier for outputting current. An operation of the hold amplifier 17 is explained below using FIG. 9.

Figure 9:
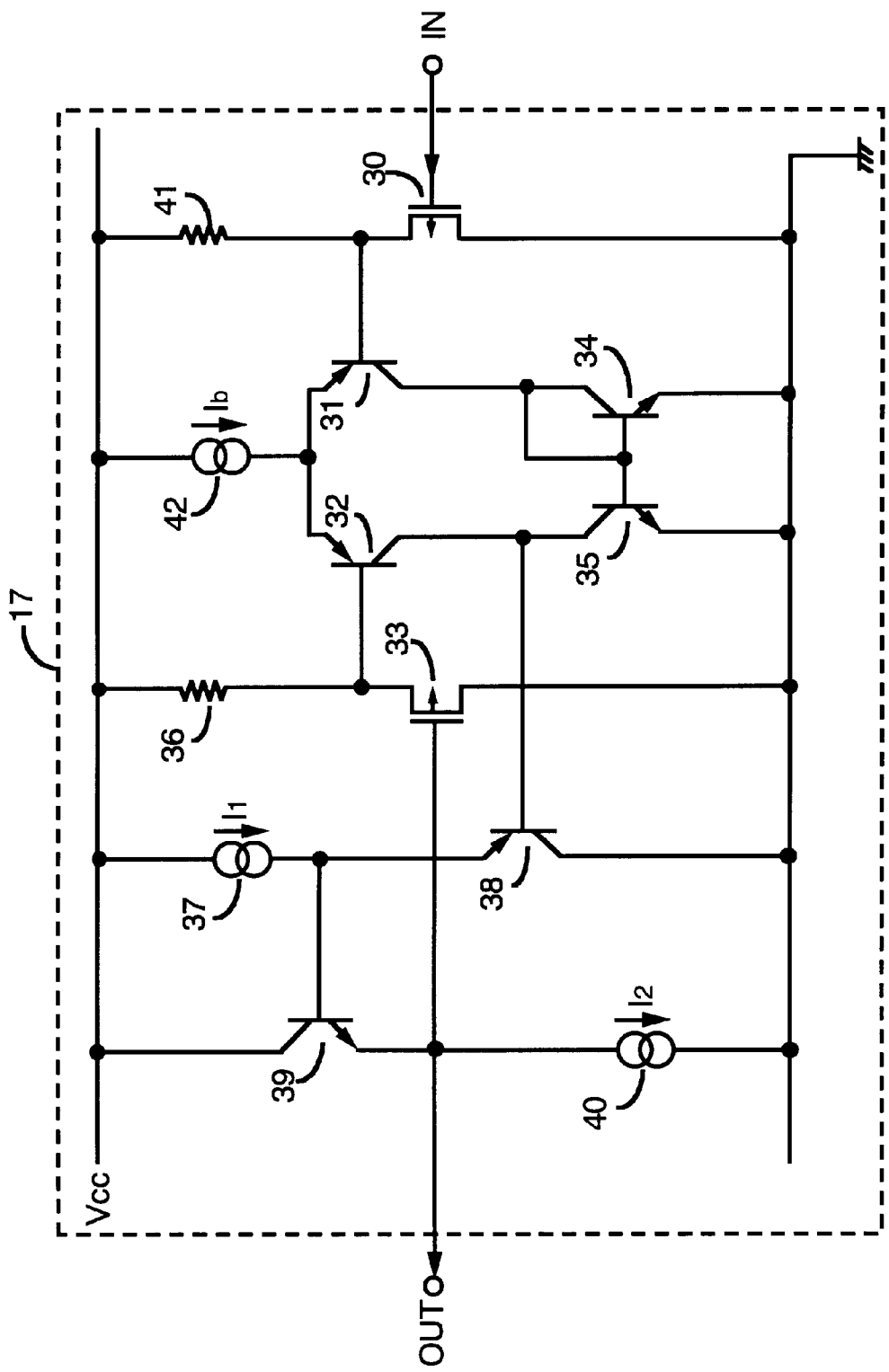
FIG. 9 shows an example of a hold amplifier using a voltage output type amplifier.

FIG. 9 shows an example of the hold amplifier 17 using a constant voltage output type amplifier. In FIG. 9, a serial circuit comprising a resistor 41 and a transistor 30 is a bias supply circuit, transistors 31, 32 constitute a differential amplifier, transistors 34, 35 constitute a current mirror circuit, a serial circuit comprising a resistor 36 and a transistor 33 is a bias supply circuit. FIG. 9 also shows transistors 38, 39 and constant current sources 37, 40, 42. The potential at the point A is applied to a gate of the transistor 30 and an output voltage of the hold amplifier 17 is applied to the base electrode of the transistor 2 via a junction of the transistor 39 and the constant current source 40.

Since a large current flows through the MR head of a hard disc during the write-state as mentioned above, the writing signal is induced into an MR element 1. As a result, a writing current ΔI is superposed on a current I flowing through the MR element 1 and then the superposed current flows through the resistor 3 which changes the voltage drop of the resistor 3. In case the writing current ΔI has a plus value, a potential $V_A$ at a node n1 decreases. A base current supplied to the base of the transistor 2 is Ir/hfe as mentioned above. Since this value is dependent on a constant current source 5, in case a current I of the transistor 2 increases, the increased base current is supplied by the hold amplifier 17.

Since the hold amplifier 17 is voltage output type, when a base potential of the transistor 2 decreases to a potential less than a predetermined value, a current for compensating the decrease of the potential is supplied from the output terminal OUT of the hold amplifier 17. When the base potential of the transistor 2 increases to a potential more than the predetermined value, a current is drawn from the base of the transistor 2 until the base potential of the transistor 2 becomes the predetermined value. As explained above, when the current of the MR element 1 increases by ΔI, for example, the hold amplifier 17 supplies the current corresponding to the decrease of the base potential of the transistor 2 to supply the current ΔI which is necessary for the MR element 1.

In this case, although the potential $V_A$ at the node n1 varies, since a feedback loop circuit including a loop amplifier 6 is open, the potential $V_A$ at the node n1 is not compensated at all via the feedback loop . Furthermore, although a signal including noise is also inputted into a signal amplifier 12, the signal superposed on the MR element 1 has no effect on the MR head amplifier because no signal processing is conducted during the write-state.

The state of the MR head amplifier changes to the read-state, the third switch 13 is switched to the X terminal and the first switch 10 turns ON. In a moment as when the potential of the capacitor 9 is applied to the base of the transistor 2, the hold amplifier 17 is opened, and the output terminal of the hold amplifier 17 is separated from the base of the transistor 2. Although the capacitor 9 is connected to an input terminal of a hold amplifier 17 during the write-state, the impedance of the input terminal is high and the capacitor 9 is in the state equivalent to being separated from the feedback loop so the potential at the point A is kept to a constant value at the preceding write-state.

Figure 11A:
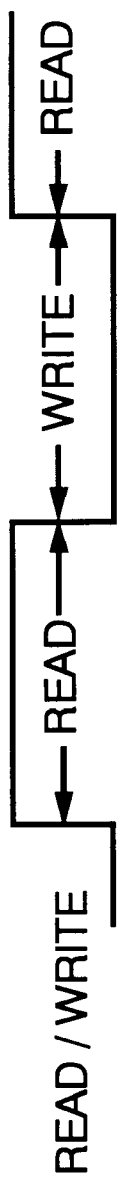
FIGS. 11A–11D show timing charts of the conventional MR head amplifier.
Figure 11B:
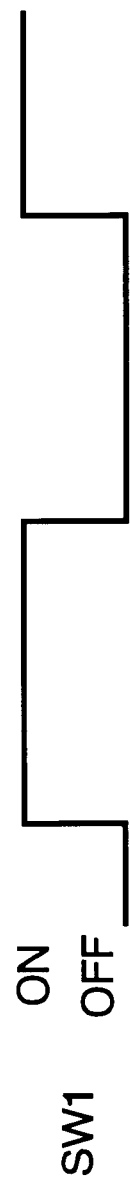
Figure 11C:
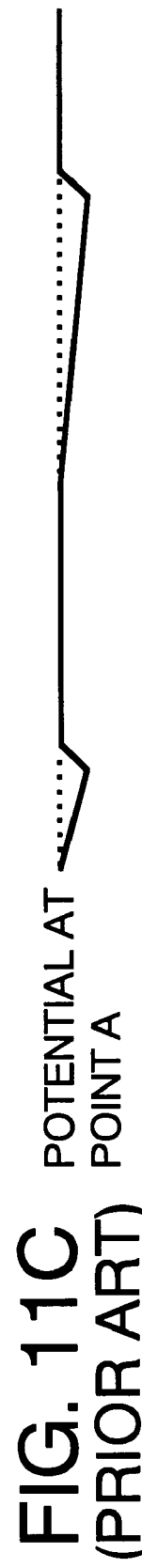
Figure 11D:
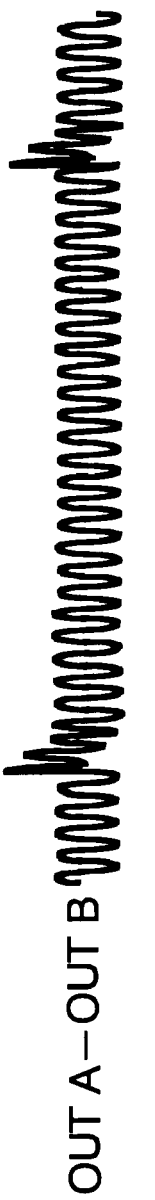
Figure 12:
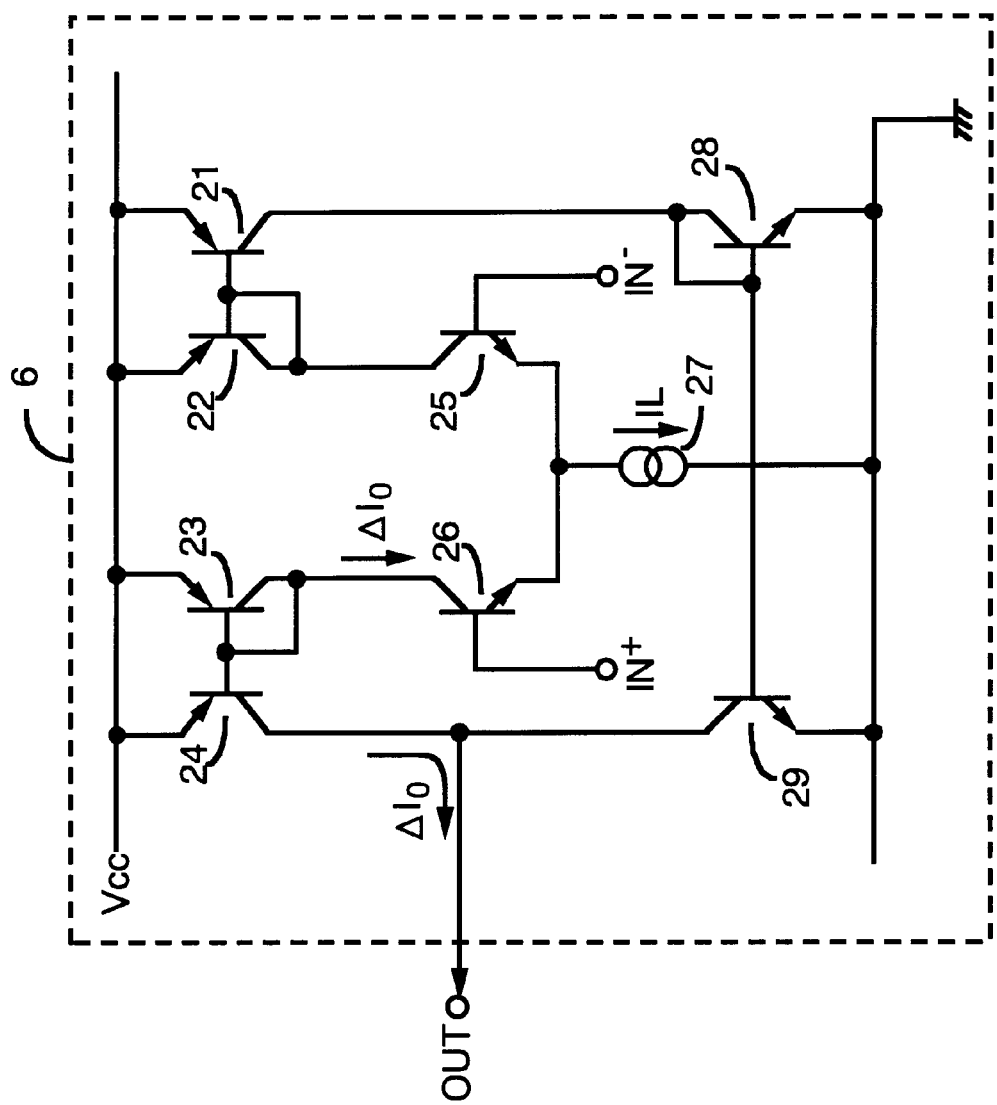
FIG. 12 shows an example of a conventional loop amplifier.

In this sate, when the third switch 13 is connected to the Y terminal and the first switch 10 turns ON, the held potential at the point A is applied to the base of the transistor 2, and, consequently, the current of the transistor 2 returns to the preceding current value I. In this way, the state for a normal reading operation by the MR element 1 is prepared and no sag, as shown in FIG. 11D, is generated between signal output terminals (OUT A–OUT B) in the read-state.

What is claimed is:

1. An MR head amplifier comprising:

a loop amplifier including a non-inverting input terminal connected to a first terminal of a first transistor which supplies a current to an MR element, and an inverting input terminal connected to a first terminal of a second transistor which is supplied with a constant current through a constant current source, wherein an output terminal of the loop amplifier is fed back to a base terminal of said first transistor via a first switch and a first end of a capacitor connected to an output terminal of said first switch, the capacitor having a second end connected to ground; and a second switch having first and second terminals, the first terminal of said second switch being connected to the output terminal of said first switch and the first end of said capacitor, and the second terminal of said second switch being connected to the base terminal of said first transistor, the first and second terminals of said second switch being connected to each other during a read-state and disconnected from each other during a write-state.

2. The MR head amplifier according to claim 1 comprising a current supply circuit connected to the second terminal of said second switch for supplying a current to the base of said first transistor during the write-state.

3. The MR head amplifier according to claim 1 comprising a hold amplifier having a non-inverting terminal connected to the first terminal of said second switch, and an inverting terminal and an output terminal connected to the second terminal of said second switch.

4. The MR head amplifier according to claim 3 wherein said hold amplifier comprises a current output type operational amplifier.

5. The MR head amplifier according to claim 1 wherein said second switch has a third terminal, the second terminal of said second switch being alternatively connectable to the first terminal and third terminal of said second switch, said amplifier comprising a hold amplifier including a non-inverting input terminal, an inverting input terminal, and an output terminal, wherein the first terminal of said second switch is connected to the non-inverting input terminal of said hold amplifier, the third terminal of said second switch is connected to the output terminal of said hold amplifier and the inverting-input terminal of said hold amplifier, and the second and third terminals of said second switch are connected to each other during the write-state.

6. The MR head amplifier according to claim 5 wherein said hold amplifier comprises a voltage output type operational amplifier.

7. The MR head amplifier according to claim 1 comprising a current mirror circuit for supplying a bias current to an MR head and a reference current to said second transistor.

* * * * *